(12) United States Patent  (10) Patent No.: US 8,179,060 B2
Wende et al.  (45) Date of Patent: May 15, 2012

(54) MOTOR CONTROLLER FOR CONTROLLING AN ELECTRIC MOTOR

(75) Inventors: Thomas Wende, Nürnberg (DE); Rainer Frisch, Wangen (DE)

(73) Assignee: Diehl AKO Stiftung & Co. KG, Wangen (DE)

( * ) Notice: Subject to any disclaimer, the term of this patent is extended or adjusted under 35 U.S.C. 154(b) by 403 days.

(21) Appl. No.: 12/464,139

(22) Filed: May 12, 2009

(65) Prior Publication Data

US 2009/0284206 A1  Nov. 19, 2009

(30) Foreign Application Priority Data

May 17, 2008 (DE) .......................... 10 2008 024 102

(51) Int. Cl.
*F04D 15/00* (2006.01)
(52) U.S. Cl. ........................................... 318/3; 318/727
(58) Field of Classification Search .................. 318/461, 318/727, 3, 34
See application file for complete search history.

(56) References Cited

U.S. PATENT DOCUMENTS

| 4,509,543 | A | * | 4/1985 | Livingston et al. | 134/57 D |
| 5,280,423 | A | * | 1/1994 | Imai et al. | 700/23 |
| 5,520,025 | A | * | 5/1996 | Joo et al. | 68/12.05 |
| 6,033,285 | A | * | 3/2000 | Fine et al. | 446/465 |
| 2006/0246814 | A1 | * | 11/2006 | Todokoro | 446/81 |
| 2008/0240484 | A1 | * | 10/2008 | Tanghe et al. | 381/370 |
| 2010/0027770 | A1 | * | 2/2010 | Park et al. | 379/106.01 |

FOREIGN PATENT DOCUMENTS

| EP | 1067669 A2 | 1/2001 |
| JP | 4200294 A | 7/1992 |
| JP | 5344740 A | 12/1993 |

* cited by examiner

*Primary Examiner* — Rina Duda
(74) *Attorney, Agent, or Firm* — Laurence A. Greenberg; Werner H. Stemer; Ralph E. Locher

(57) ABSTRACT

A motor controller for controlling at least one electric motor has an operating signal generator for generating an operating control signal for the at least one electric motor and also a sound signal generator for generating a sound control signal. A mixer superimposes the sound control signal on the operating control signal in order to obtain a control signal for the at least one electric motor. It is then possible to dispense with loudspeakers and the like in the appliance which contains an electric motor with such a motor controller in order to output, for example, signal tones which indicate an operating state of the appliance to the user.

5 Claims, 1 Drawing Sheet

MOTOR CONTROLLER FOR CONTROLLING AN ELECTRIC MOTOR

CROSS-REFERENCE TO RELATED APPLICATION

This application claims the priority, under 35 U.S.C. §119, of German patent application DE 10 2008 024 102.4, filed May 17, 2008; the prior application is herewith incorporated by reference in its entirety.

BACKGROUND OF THE INVENTION

Field of the Invention

The present invention relates to a motor controller for controlling at least one electric motor.

Electric motors are generally used to convert electrical energy into kinetic energy. They are used, inter alia, in electronic domestic appliances such as washing machines, microwaves and the like. Sound waves generated by the electric motor during the operation of the appliance can usually be perceived by the user. The aim of the manufacturer is generally to minimize these sound waves.

Many electronic appliances also need a loudspeaker or similar acoustic output devices in order to indicate an operating state of the appliance to the user, for example by way of signal tones, to confirm a user input, to output an alarm, to convey information, and the like.

SUMMARY OF THE INVENTION

It is accordingly an object of the invention to provide a motor controller for driving an electric motor which overcomes the above-mentioned disadvantages of the heretofore-known devices and methods of this general type and which further allows to simplify the structure of electronic appliances containing an electric motor.

With the foregoing and other objects in view there is provided, in accordance with the invention, a motor controller for controlling one or more electric motors. The motor controller comprises:

an operating signal generator for generating an operating control signal for the at least one electric motor;

a sound signal generator for generating a sound control signal; and a mixer connected to the operating signal generator and to the sound signal generator, for superimposing the sound control signal on the operating control signal and to thereby obtain a control signal for controlling the at least one electric motor.

In other words, the motor controller for controlling at least one electric motor contains an operating signal generator for generating an operating control signal for the at least one electric motor and also a sound signal generator for generating a sound control signal as well as a mixer for superimposing the sound control signal on the operating control signal in order to obtain a control signal for the at least one electric motor.

The motor controller according to the invention supplies the electric motor not only with the conventional operating control signal but also with a sound control signal, with the result that the energy supplied to the electric motor—depending on the operating control signal—is converted not only into a rotational movement of the motor shaft but also into a vibration of components of the electric motor, with the result that the electric motor functions as a loudspeaker. This design makes it possible to dispense with the provision of a loudspeaker, buzzer or similar tone output devices in an electronic appliance but nevertheless makes it possible for the electronic appliance to output some type of information in the form of sound.

In principle, the present invention can be used in this case in any desired electric motor. In particular, conventional (standard) electric motors may also be used without having to modify them.

The operating control signal of the invention corresponds to the conventional control signal of an electric motor and contains, for example, information relating to the desired rotational speed of the electric motor, which may be different depending on the operating state of the electronic appliance. In contrast, the sound control signal contains information relating to the generation of acoustic information. The sound control signal is superimposed or modulated onto the operating control signal by a mixer in order to generate a control signal for the electric motor.

In accordance with an added feature of the invention, the motor controller also contains a frequency converter which is supplied with the control signal from the mixer and operates the electric motor at an appropriate drive frequency.

In an alternative embodiment of the invention, the motor controller also contains a frequency converter which is supplied with the operating control signal from the operating signal generator and the sound control signal from the sound signal generator, and the mixer is integrated in the frequency converter in order to generate the control signal for generating the desired drive frequency for the electric motor.

In accordance with an additional feature of the invention, the sound control signal generated by the sound signal generator is suitable for generating signal tones, music and/or speech by means of the electric motor.

In accordance with a concomitant feature of the invention, the electric motor is an electric motor in an electronic domestic appliance.

Other features which are considered as characteristic for the invention are set forth in the appended claims.

Although the invention is illustrated and described herein as embodied in a motor controller for controlling an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

DETAILED DESCRIPTION OF THE INVENTION

Figure 1:
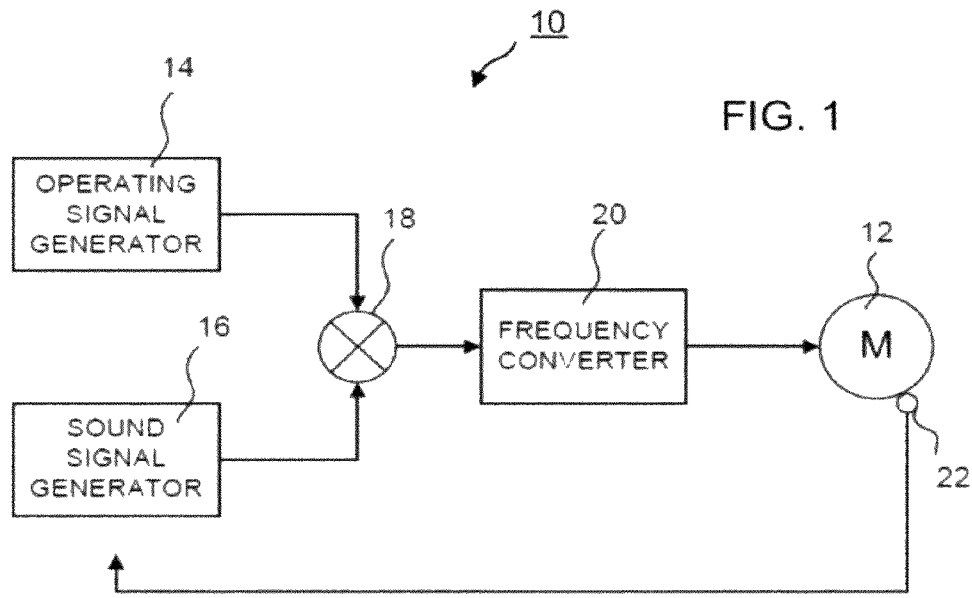
FIG. 1 is a schematic diagram illustrating the motor controller for controlling an electric motor according to the invention.

Referring now to the figures of the drawing in detail there is shown, in a highly simplified manner, the structure of a motor controller 10 for an electric motor 12. The electric motor 12 is, for example, part of an electronic domestic appliance, also referred to as a household appliance, for example a washing machine, a microwave, a dryer, a vacuum cleaner, or the like.

The motor controller 10 includes an operating signal generator 14 for generating an operating control signal containing information relating to the desired rotational speed of the electric motor 12 for operating the electronic appliance. The rotational speed of the electric motor 12 may either always be the same for an electronic appliance or may be different depending on the operating state, program mode and the like.

A sound signal generator 16 is also provided in the motor controller 10. The sound signal generator 16 generates a sound control signal relating to audible acoustic information which is intended to be output by the electronic appliance. In the simplest case, this acoustic information may contain, for example, a signal tone (at a fixed frequency) relating to an operating state of the electronic appliance, a confirmation of a user input, an alarm or fault message, and also a tone sequence or music, and/or speech information.

A mixer 18 is used to superimpose or modulate the sound control signal generated by the sound signal generator 16 onto the operating control signal generated by the operating signal generator 14. The control signal generated in this manner is supplied to a frequency converter 20 which operates the electric motor 12 at a rotational speed corresponding to the drive frequency specified by the control signal.

If the drive frequency of the electric motor 12 is selected using the operating control signal and the sound control signal in such a manner that the electrical energy supplied to the electric motor 12 is at least not completely converted into a rotational movement of the motor shaft but rather is at least partially converted into a vibration of components of the electric motor, the electric motor 12 functions as a loudspeaker. The information acoustically output by the electric motor 12 in this manner may be controlled in this case by the sound control signal from the sound signal generator 16. For this purpose, the sound signal generator 16 is also connected, for example, to a non-illustrate memory which may store different sound control signals generated in advance for the purpose of generating particular acoustic information.

If the electric motor 12 is, for example, an electric motor which is installed in a washing machine, the drum of the washing machine may additionally act as a resonant body or resonator and may thus amplify the acoustic signal generated by the electric motor 12.

Depending on the type and design of the electric motor and the electronic appliance in which the electric motor is installed, the acoustic information may be generated by the electric motor 12 only when the latter is not currently rotating its motor shaft or else when the motor is rotating its motor shaft.

Figure 2:
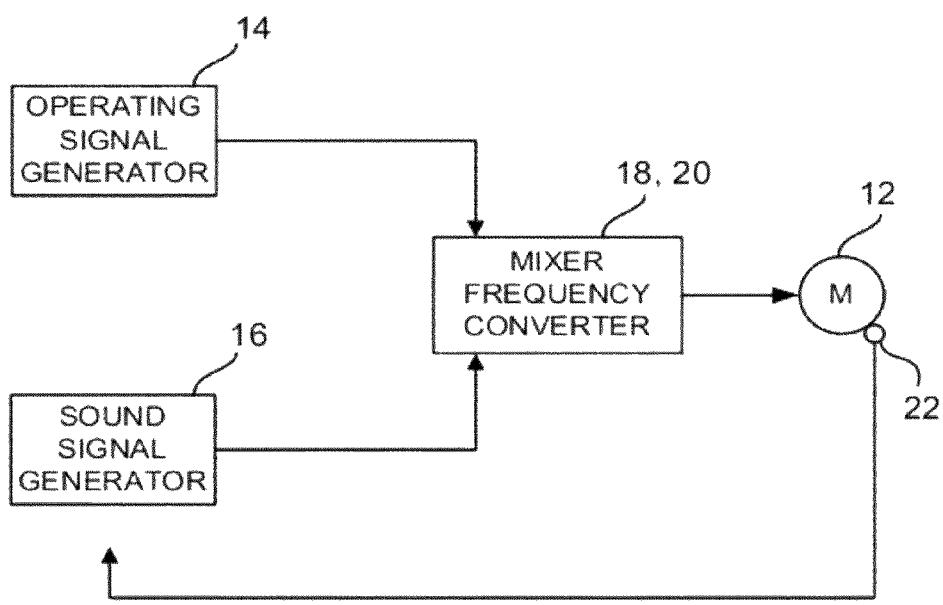
FIG. 2 is a diagram illustrating an alternative embodiment.

In the exemplary embodiment illustrated in FIG. 1, the frequency converter 20 is supplied with a control signal which represents a superposition of the operating control signal and the sound control signal. Alternatively, as illustrated in FIG. 2, it is also possible to separately supply the operating control signal from the operating signal generator 14 and the sound control signal from the sound signal generator 16 to the frequency converter 20 and to superimpose the signals using a mixer that is integrated in the frequency converter 20.

As indicated in the figure, it is also possible to provide the electric motor 12 with a rotational speed sensor 22 for detecting its current rotational speed. The current rotational speed detected in this manner is supplied to the motor controller 10, with the result that the operating control signal from the operating signal generator 14 and/or the sound control signal from the sound signal generator 16 can be adapted to the actual operating state of the electric motor 12.

The motor controller 10 of the invention can also control either an electric motor 12, as illustrated in the figure, or else a plurality of electric motors.

The motor controller of the invention as described above can advantageously be used for electric motors in electronic domestic appliances (washing machines, microwaves etc.). It will be readily understood by those of appropriate skill in the art that the use of the above-described motor controller is not to be restricted to such electronic appliances.

The invention claimed is:

1. A motor controller for controlling at least one electric motor, comprising:
    an operating signal generator for generating an operating control signal for the at least one electric motor;
    a sound signal generator for generating a sound control signal; and
    a mixer connected to said operating signal generator and to said sound signal generator, for superimposing the sound control signal on the operating control signal and to thereby obtain a control signal for controlling the at least one electric motor; and
    a frequency converter connected to receive the control signal from said mixer.

2. A motor controller for controlling at least one electric motor, comprising:
    an operating signal generator for generating an operating control signal for the at least one electric motor;
    a sound signal generator for generating a sound control signal;
    a mixer connected to said operating signal generator and to said sound signal generator, for superimposing the sound control signal on the operating control signal and to thereby obtain a control signal for controlling the at least one electric motor; and
    a frequency converter connected to receive the operating control signal from said operating signal generator and the sound control signal from said sound signal generator; and wherein said mixer is integrated in said frequency converter.

3. The motor controller according to claim 1, wherein the sound control signal generated by said sound signal generator is suitable for generating signal tones, music, and/or speech by way of the electric motor.

4. The motor controller according to claim 1, wherein the electric motor is an electric motor in an electronic domestic appliance.

5. A motor controller for controlling an electric motor, comprising:
    an operating signal generator for generating an operating control signal for driving the electric motor;
    a sound signal generator for generating a sound control signal; and
    a mixer connected to said operating signal generator for receiving the operating control signal and to said sound signal generator for receiving the sound control signal, said mixer being configured for superimposing the sound control signal on the operating control signal and to thereby obtain a control signal for controlling the electric motor by way of which the electric motor is driven by the operating control signal and excited to output sound corresponding to the sound control signal.

* * * * *